Nov. 1, 1949 C. W. KEUFFEL 2,486,954
MIRROR SYSTEM FOR VIEWING LEVEL VIALS
Filed June 7, 1946 2 Sheets-Sheet 1
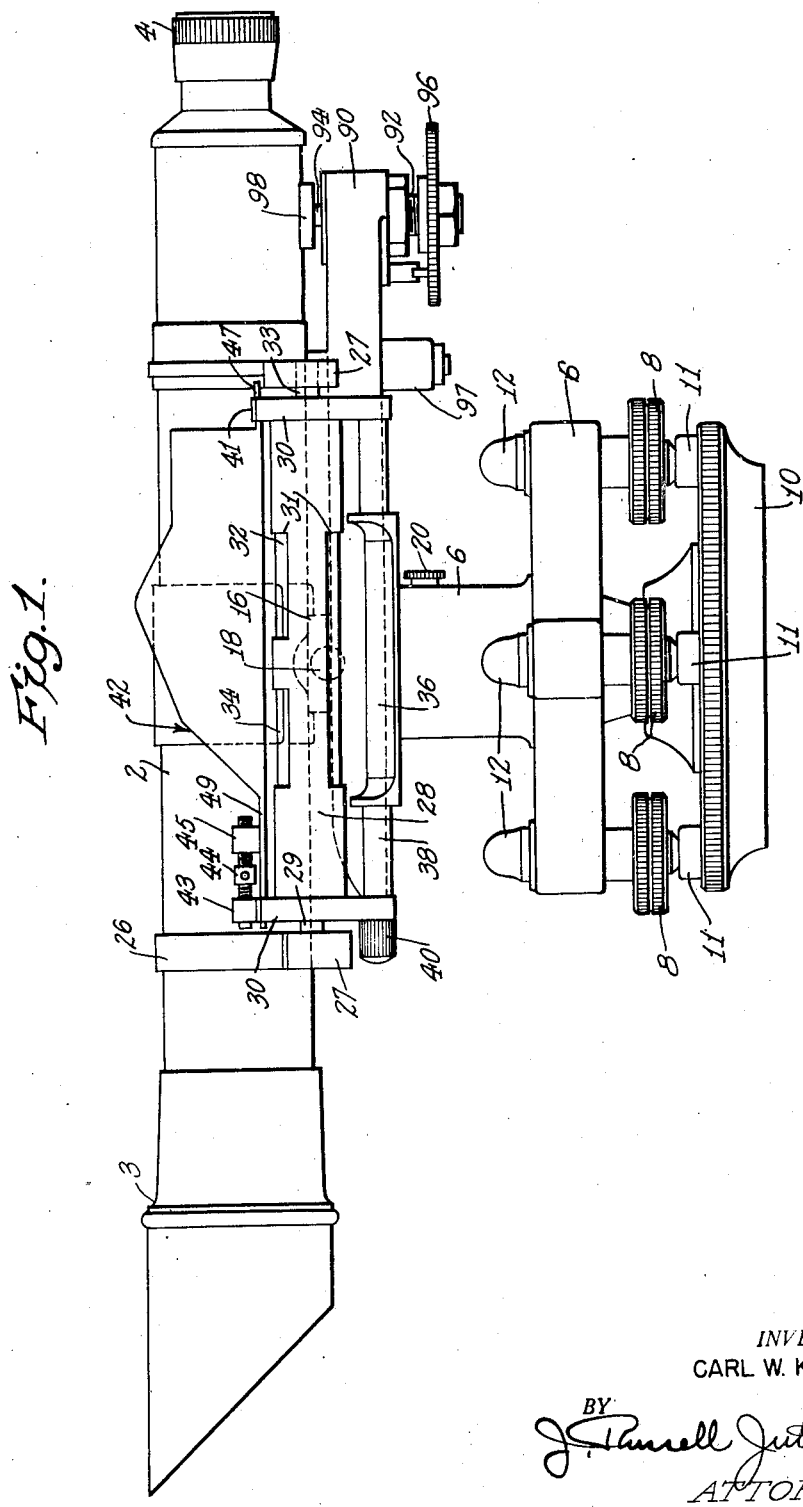
INVENTOR.
CARL W. KEUFFEL
BY
*J. Russell Juten*
ATTORNEY

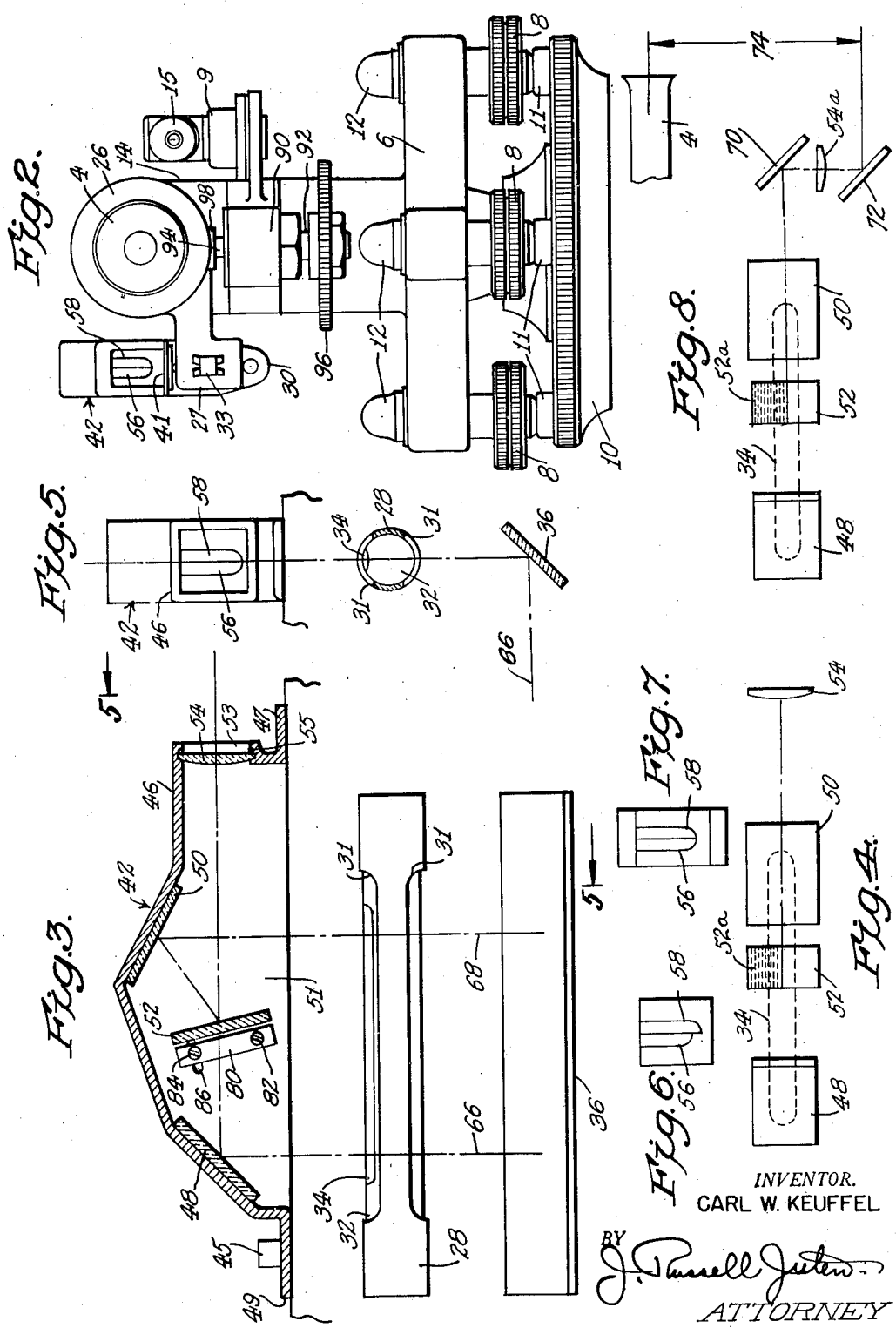

Patented Nov. 1, 1949

2,486,954

UNITED STATES PATENT OFFICE 2,486,954

MIRROR SYSTEM FOR VIEWING LEVEL VIALS

Carl W. Keuffel, Bernardsville, N. J., assignor to Keuffel & Esser Company, Hoboken, N. J., a corporation of New Jersey Application June 7, 1946, Serial No. 675,037

2 Claims. (Cl. 88—74)

This invention relates to level vials or spirit levels generally and in particular to a device for viewing the relative location of the bubble in a level vial from a position remote from the vial.

Level vials which consist of a curved glass flask or vial containing a liquid in an amount to form a bubble, are incorporated in a large number of types and kinds of instruments and devices for the purpose of adjusting the position of the instrument or device so that it bears a desired relation to the true horizontal or for determining the relation between a given plane or surface and the true horizontal or vertical.

An example of an instrument in which a level vial is incorporated is the surveyors' level in which the level vial is mounted in fixed relation to the telescope in order that the telescope may be adjusted so that its line of collimation is in a true horizontal position. For convenience, the description of my invention will be confined to its use in connection with surveyors' levels but it should be understood that there is no intention of limiting the invention to such use.

In accurate surveying work with a surveyors' level, it is good practice to check and determine the accuracy of the setting of the instrument before taking each reading as the instrument might be slightly displaced by vibration, wind or physical contact before a reading is taken. The setting of the surveyors' level (i. e. the position of the axis of the telescope with respect to the horizontal) is checked by observing the position of the bubble in the level vial. To check the setting of the instrument before each reading, it is desirable for the observer to be able to view the position of the bubble in the level vial without substantially changing his position. To accomplish this, such instruments in the past have been provided with an elaborate and expensive arrangement of ground prisms and reflectors whereby the user could observe the relative positions of the ends of the bubble by a slight lateral motion of his head from the eyepiece of the telescope.

An object of the present invention is to provide an improved device which can be constructed cheaply and simply whereby the relative position of the ends of the bubble in a level vial can be viewed from a position remote from the level vial.

Another object of the invention is to provide a bubble viewing device in which all the reflecting surfaces are enclosed in a protective housing.

A still further object of the invention is to provide a bubble viewing device which is neat in appearance and inexpensive to manufacture.

Another object of the invention is to provide a bubble viewing device in which at least one of the reflecting surfaces is adjustable so that an extremely accurate initial setting can be made.

Another object of the invention is to provide a bubble viewing device which though simple in design and construction enables the user by working with coinciding lines to determine the location of the bubble and the horizontal position with extreme accuracy.

A further object is to provide in a level means for adjusting the telescope very accurately.

Other objects and advantages of the invention will become apparent from a study of the following specifications taken in connection with drawings wherein:

Fig. 1 is a view in side elevation of a surveying instrument embodying the present invention.

Fig. 2 is a view in front elevation of Fig. 1.

Fig. 3 is a schematic drawing of bubble and viewing elements of Fig. 1 shown in their proper relation but with supporting elements removed.

Fig. 4 is a schematic view in plan of some of the elements of Fig. 3.

Fig. 5 is a view in section along the line 5—5 of some of the elements of Fig. 3 looking in the direction of the arrows.

Figs. 6 and 7 are views in elevation thru the eye lens of Fig. 5 showing the bubbles before and after the telescope is leveled.

Fig. 8 is a schematic view in plan, generally similar to Fig. 4 showing a modified construction.

Figs. 1 and 2 show an engineer's precision level in which has been embodied one form of the present invention. The surveyor's level consists of the telescope element 2 containing the usual system of optical lenses and a reticule to permit an observer to see in enlarged view a stadia rod or leveling rod placed at a distance from the instrument with the cross hairs of the reticule superimposed thereon by looking through the eyepiece 4. At 3 but not shown is the optical element called the objective lens. The construction of telescope elements of levels is familiar to those skilled in the art and it is not deemed necessary to describe such construction or operation to make clear the advantages of the present invention.

Adjustment of the telescope about a horizontal axis is possible by virtue of trunnions 18 mounted on the telescope element 2 and accurately fitted in journals 16 which are securely fastened to or a part of a vertical spindle or "center," not shown. The center is accurately journaled in level head 6 so that the telescope element 2 may be rotated about a vertical axis. A clamp screw 20 locks the "center" and the telescope against rotation when observations are being made.

The level head 6 is supported on the tripod plate 10. By loosening one of the leveling screws 8 and tightening the leveling screw diametrically opposed, the leveling head 6 together with the "center" and the telescope element 2 can be made to revolve through a small angle to assume, within limits, any angle to the plane of the tripod plate 10.

Ring-like level tube brackets 26 are fitted to the telescope 2 and are provided with projection 27 in one of which is adjustably mounted ball joint member 29 and in the other a shaft like member 33, rectangular in cross section. Both members 29 and 33 are rigidly fastened to level tube end members 30 which in turn support the level tube 28. Below the level tube 28, there is rotatably mounted in level tube end members 30 a reflector support rod 38 one end of which is provided with knurled knob 40. Centrally located between level tube end members 30 and rigidly fastened to reflector support rod 38 is a light-reflecting surface 36 consisting of a white reflecting plastic, a polished glass or a metal member.

Mounted on level tube end members 30 is the bubble viewing device 42 which has lateral projections 47 and 49 extending over level tube end member 30. The bubble viewing device is held in position against vertical displacement by end plate 41 and threaded end plate member 43 which overlay the lateral projections 47 and 49 of bubble viewing device 42. Its horizontal position relative to the level tube end members 30 is adjusted by means of the adjusting turnbuckle screw 44 which is threadedly engaged by means of a right hand thread with threaded end plate member 43 which is rigidly fastened to level tube end member 30 and also threadedly engaged with a left hand thread to nut like member 45 which is rigidly fastened to the bubble viewing device 42.

The level tube is cyclindrical in form and is provided with cut out portions 31. Securely mounted in the level tube by cement or other means is a cyclindrical level vial 32, a glass flask containing a liquid in such quantity that a bubble 34 is provided. The interior of the vial is accurately ground to a predetermined radius. By means of the adjustable mounting of the ball joint member 29 and the shaft like member 33 in the projections 27 of the level tube brackets 26, the position of the level tube 28 can be adjusted so that its axis and the axis of collimation of the telescope element 2 are parallel. When so adjusted, it follows that when the level tube 28 and its contained level vial 32 is in a true horizontal position, the telescope element 2 is also in a true horizontal position and the ends of the bubble 34 are in a definite position with respect to the level vial 32, the level tube 28 and the level tube end members 30.

Referring to Fig. 3, the bubble viewing device 42 is illustrated as comprising housing 46 in the form of a sheet metal stamping or a die casting having elongated rectangular section. The form and proportions of the profile of the housing 46 are determined by special considerations which will be apparent from the following description. The housing 46 is open at the bottom and is provided with end projections 47 and 49 with a generally rectangular aperture 53 at one end.

Fastened to the interior surface of the housing 46 by cementing or other means are full silvered reflectors or mirrors 48 and 50. These may be silvered glass front or back surfaced mirrors or may be polished metal or the like. In the rectangular aperture 53, there is placed an optical glass magnifier 54 which is held in position by cement or by a retaining ring 55 or by a combination of both. Supported from the side wall 51 of the housing 46 as by means of bracket support 80 and retaining screws 82 and 84 is a half silvered reflecting mirror 52. This mirror is silvered in such a manner that the half 52a of the mirror on one side of the axial center line of the level vial 32 is full silvered and the half on the other side of the axial center line has no silvering whatever and is fully transparent.

The same effect can be obtained by providing a full silvered mirror extending from the side wall 51 housing 46 up to the axial center line of the level vial 32. Projections 47 and 49 slidingly engage the level tube end members 30 (as shown in Fig. 1) and the lateral position of the bubble viewing device 42 is adjusted and held in position by the combination of adjusting screw 44 and nut like member 45 (see Fig. 1).

The bubble viewing device 42 is disposed over the level tube 28 and level vial 32 so that the axial center line of the bubble viewing device 42 is directly over the axial center line of the level vial 32. Referring to Fig. 4 it will be noted that reflecting mirror 48 need be superimposed over only one half of the end of the bubble 34 nearest the objective lens 3 of the instrument. It will also be noted that the reflecting element 50 need be superimposed over the opposite half of the end of the bubble 34 nearest the eyepiece end of the instrument. They may of course be full width and are so illustrated in Fig. 4.

Referring again to Fig. 3 and also to Figs. 5, 6 and 7 it is possible to trace the path of a ray of light 66 as follows; a ray of light 55 from some external source such as ordinary daylight strikes the reflector 36 which has been adjusted to obtain the best light available and is reflected vertically through the bubble vial 32, at the end nearest the objective lens 3 of the instrument. The ray 66 strikes the reflecting mirror 48, which is held at a fixed convenient angle (45°) by the conformation of housing 46, so that the ray of light 66 is now reflected in a horizontal direction through the clear half of the half silvered mirror 52 and through the magnifier 54 in a horizontal path. Another ray of light 68 from an outside source such as daylight, is reflected in a vertical direction from the reflector 36 through the level vial 32 at the end nearest the eyepiece of the instrument to the reflecting mirror 50 which is held in a fixed convenient position at an angle of 27.5° from the horizontal by the conformation of housing 46. The ray of light 68 is reflected in a generally downward direction to the silvered half of the half silvered mirror 52 which is also set at a correlated (total of 45°) angle of 17.5° from the vertical so that the ray of light 68 is reflected in a horizontal direction through the magnifier 54. The position of reflecting surfaces or mirrors 48 and 50 is so arranged by the conformation of housing 46 that the distance the ray of light 66 travels from the top surface of the level vial 32 to the reflecting surface or mirror 48 and to the surface of the half silvered mirror 52 is the same as the distance the ray of light 68 travels from the top surface of the level vial 32 to the reflecting surface or mirror 50 and to the surface of the half silvered mirror 52. With this arrangement, the opposite ends of the bubble 34 when viewed through the magnifier appear to be exactly the same distance from the observer. The reflection from mirror 48 is of the end of the level vial 32 nearer the objective lens end of the instrument. Only one half of the level vial or whatever appears in that end of the level vial such as the edges of the bubble will be seen by an observer looking in a horizontal direction through the magnifier 54 as it is limited to one half by the silvering on the mirror 52. It further follows that since the reflection from mirror 50 is limited to the opposite half of the other end of the level vial 32, i. e. the end nearer the eyepiece of the instrument, by the mirror 52 only that half of the end of the level vial 32 or what appears in that half such as the edge of the bubble will be seen by an observer looking in a horizontal direction through the magnifier 54.

When the level tube 28 and its contained level vial 32 are adjusted so that the axis of the level vial is substantially parallel to the axis of the telescope element 2, the bubble 34 of the level vial 32 will be in a definite position relative to the level vial 34 and the axis of the telescope element 2 is in a true horizontal position as determined by test instruments. The bubble 34 will always be in this same position when the telescope element 2 is in a true horizontal position. The bubble viewing device 42 is positioned over the level vial 32 so that the ends of the bubble 34 can be seen thru the magnifier 54 in the viewing opening. The size of the bubble will vary with the temperature; thus the ends of the bubble may under some conditions be seen near the top of the viewing opening and at other times near the bottom when the instrument has been leveled. With this arrangement of the various elements, the reflections 56 and 58 of the ends of the bubble 34 as viewed through the magnifier 54 might appear as shown in Fig. 6 due to some slight misalignment or improper adjustment of the reflecting mirrors 48 and 50. To permit adjustment the bracket 80 supporting the half silvered reflecting mirror 52 is mounted so that the holding screw 82 acts as a pivot and the holding screw 84 is positioned in an arcuate slot in side wall 51 of housing 46 so that the bracket 70 and the half silvered mirror 52 can be moved through a small angle about the center of holding screw 82. By moving the half silvered mirror 52 in a clockwise or counterclockwise direction as viewed in Fig. 3, the reflection 58 of the half of the end of the bubble 34 can be made to move downward or upward as viewed in Fig. 5 until the end loop of the reflection 58 of one half of one end of the bubble 34 is in alignment with the end loop of reflection 56 of one half of the other end of the bubble 34, as shown in Fig. 7. The bracket 80 holding the half-silvered mirror 52 may be fastened in this position by tightening holding screws 82 and 84.

With the telescope element 2, the level tube 28 and its contained level vial 32 and the bubble viewing device 42 aligned and adjusted as just described, a small movement of the telescope element 2 from a true horizontal position causes the level tube 28 to move from a true horizontal position and causes the bubble 34 in level vial 32 to move longitudinally with respect to the level vial 32. Such a movement would cause reflections 56 and 58 of opposite halves of opposite ends of the bubble 34 as viewed through the magnifier 54 to move in opposite directions and cause a misalignment as shown in Fig. 6. When the telescope element 2 and the level tube 28 and its contained level vial 32 are returned to a true horizontal position, the bubble 34 will return to its original position and the reflections 56 and 58 of the opposite halves of opposite ends of the bubble 34 will return to alignment as shown in Fig. 7.

In actual practice in the field, the instrument is set up on a tripod (not shown) and the axis of the telescope element 2 adjusted to an approximate horizontal position, as evidenced by bubble in circular vial 9 viewed in reflector 15, by means of leveling screws 8 for all azimuth positions of the telescope element 2. The reflections 56 and 58 of the bubble 34 are then viewed through magnifier 54 and any misalignment is corrected by means of a micrometer leveling device which may be of a type usually incorporated in precise leveling instrument. However, in the preferred form of the invention an arm like member 90 is supported by leveling head 6. It revolves around the vertical axis of the "center" with the telescope element 2. A small angular motion of telescope element 2 about the horizontal axis of the trunnions 18 is obtained by the micrometer screw 92 threadedly engaged at the extremity of arm 90. The projection 94 of the micrometer screw 92 bears on a boss 98 securely attached to telescope element 2. Rotation of micrometer wheel 96 causes projection 94 to raise or lower and causes a small clockwise or counterclockwise motion of telescope element 2 about the axis of the trunnions 18. A spring, not shown in housing 97 urges the eyepiece end of the telescope against projectional 94.

Having set the instrument so that the telescope element 2 is in a true horizontal position, it is a relatively simple operation for the user to check the level of the instrument just before and immediately after each reading by observing the alignment of the reflections 56 and 58 of the bubble 34 through the magnifier 53. Any slight corrections that might be necessary can be made with micrometer wheel 96.

In the construction illustrated and described above the operator first looks through the telescope then looks through the magnifier to check the level of the instrument since the two points of observation are spaced. It may be desired to construct the device so that with one eye an observation is made through the telescope while with the other eye the position of the bubble is checked. This can be readily accomplished as in the construction of Fig. 8 by placing the magnifier 54a in an opening at the side of the housing 46 near the same end. Inside the end of the housing would be placed a mirror 70 which with a mirror 72 outside of the casing would space the two points of observation at the pupilary distance 74 of the operator. The mirror 72 may be mounted on any suitable bracket such as an arm hinged on the housing 46.

The foregoing description is of certain preferred embodiments of my invention. It will be apparent that various modifications can be devised by those skilled in the art within the scope of the appended claims.

I claim:

1. In an instrument having a level vial with a bubble therein attached to a sighting device, means for viewing said level vial to orient the sighting device in a predetermined direction comprising a housing mounted over the level vial and having a light transmitting opening at the bottom and a second light transmitting opening at one end, a first mirror comprising a flat piece of material of substantially uniform thickness mounted within the other end of said housing and above one end of the bubble in said level vial having a reflecting surface which is substantially perpendicular to a vertical plane through the axis of said level vial and inclined to face the end and bottom openings, a second mirror comprising a flat piece of material of substantially uniform thickness mounted within said housing between the end opening and said first mirror above the other end of the bubble in said level vial having a reflecting surface which is substantially perpendicular to the vertical plane through the axis of said level vial and inclined to face said first mirror and the bottom opening, said housing having means for configuring the reflecting surfaces of said first and second mirrors in their relative positions with respect to each other and the openings in said housing, a mount supported by and within said housing between said inclined reflecting surfaces and a third mirror comprising a flat piece of material of substantially uniform thickness supported on said mount having a reflecting surface substantially perpendicular to the vertical plane through the axis of said level vial and facing in the general direction of said opening and second mirror, said mount positioning the reflecting surface of said third mirror so that the distance therefrom to the ends of the bubble via the paths followed by the light is substantially equal, whereby opposite ends of the bubble in said level vial may be viewed simultaneously through the light transmitting opening at one end of said housing and so that the ends of the bubble will appear in alignment as viewed through the opening when the sighting device is oriented in the predetermined direction.

2. In an instrument having a level vial with a bubble therein attached to a sighting device, means for viewing said level vial to orient the sighting device in a predetermined direction comprising a housing mounted over the level vial and having a light transmitting opening at the bottom and a second light transmitting opening at one end, a first mirror comprising a flat piece of material of substantially uniform thickness mounted within the other end of said housing and above one end of the bubble in said level vial having a reflecting surface which is substantially perpendicular to a vertical plane through the axis of said level vial and inclined to face the end and bottom openings, a second mirror comprising a flat piece of material of substantially uniform thickness mounted within said housing between the end opening and said first mirror above the other end of the bubble in said level vial having a reflecting surface which is substantially perpendicular to the vertical plane through the axis of said level vial and inclined to face said first mirror and the bottom opening, said housing having means for configuring the reflecting surfaces of said first and second mirrors in their relative positions with respect to each other and the openings in said housing, a mount within said housing between said inclined reflecting surfaces, means supporting said mount within said housing and permitting the adjustment thereof with respect to said first and second mirrors, means for locking said mount in adjusted position, a third mirror comprising a flat piece of material of substantially uniform thickness supported on said mount having a reflecting surface substantially perpendicular to the vertical plane through the axis of said level vial and facing in the general direction of said opening and said second mirror, said mount positioning the reflecting surface of said third mirror so that the distance therefrom to the ends of the bubble vial the paths followed by the light is substantially equal and a magnifier fixed in the end opening of said housing, whereby opposite ends of the bubble in said level vial may be viewed simultaneously through said magnifier and so that the ends of the bubble will appear in alignment as viewed through the opening when the sighting device is oriented in the predetermined direction.

CARL W. KEUFFEL.

REFERENCES CITED

The following references are of record in the file of this patent:

UNITED STATES PATENTS

| Number | Name | Date |
|---|---|---|
| 456,404 | Davis | July 21, 1891 |
| 1,034,049 | Wild | July 30, 1912 |
| 1,705,146 | Willson | Mar. 12, 1929 |
| 1,885,744 | Malcom | Nov. 1, 1932 |
| 2,231,036 | Suverkrop | Feb. 11, 1941 |

FOREIGN PATENTS

| Number | Country | Date |
|---|---|---|
| 212,823 | Great Britain | Mar. 29, 1924 |